(12) United States Patent
Gouch et al.

(10) Patent No.: US 12,529,632 B2
(45) Date of Patent: Jan. 20, 2026

(54) METHOD OF FORMING AN IMAGING CALIBRATION DEVICE

(71) Applicant: Ventana Medical Systems, Inc., Tucson, AZ (US)

(72) Inventors: Martin Philip Gouch, Hemel Hempstead (GB); William Craig Revie, Hemel Hempstead (GB); Jacqueline Margaret Deane, Hemel Hempstead (GB); Louise Joanne Collins, Hemel Hempstead (GB); Richard Michael Salmon, Hemel Hempstead (GB)

(73) Assignee: Ventana Medical Systems, Inc., Tucson, AZ (US)

( * ) Notice: Subject to any disclaimer, the term of this patent is extended or adjusted under 35 U.S.C. 154(b) by 965 days.

(21) Appl. No.: 17/711,238

(22) Filed: Apr. 1, 2022

(65) Prior Publication Data

US 2022/0334032 A1 Oct. 20, 2022

(30) Foreign Application Priority Data

Apr. 17, 2021 (GB) ..................... 2105498

(51) Int. Cl.
*G02B 21/00* (2006.01)
*G01N 1/31* (2006.01)
(52) U.S. Cl.
CPC .................. *G01N 1/312* (2013.01)

(58) Field of Classification Search
None
See application file for complete search history.

(56) References Cited

U.S. PATENT DOCUMENTS

| 9,454,691 | B2 | 9/2016 | Revie et al. |
| 10,241,310 | B2 | 3/2019 | Gouch et al. |
| 2005/0142654 | A1 | 6/2005 | Matsumoto et al. |
| 2018/0043130 | A1* | 2/2018 | Moore-Ede ........... A61M 21/02 |

OTHER PUBLICATIONS

Chinese Office Action for CN Application No. 202210365955.1, dated Mar. 25, 2025, 7 pages.

* cited by examiner

*Primary Examiner* — Jyoti Nagpaul
(74) *Attorney, Agent, or Firm* — Womble Bond Dickinson (US) LLP (57) ABSTRACT

A method of forming an imaging calibration device for a biological material imaging system is provided. A first set of one or more discrete regions is provided upon or within a retaining member. Each said region of the first set comprises a selected tissue stain material, wherein each of the selected tissue stain materials exhibits a predetermined optical response inside a colour-stable region of a chromaticity diagram defined by the ellipse $x^2/a^2 + y^2/b^2 = 1$, where $a=0.21$, $b=0.135$, the rotation is $-0.07$ rad and the translation is $(0.38, 0.333)$. A second set of one or more discrete regions is also provided upon or within the retaining member. The second set is formed of one or more coloured filters having a predetermined optical response outside the colour-stable region.

20 Claims, 7 Drawing Sheets

| Stain type |
|---|
| H&E (hematoxylin and eosin) |
| Silver |
| Prussian Blue |
| Sudan |
| PAS (Periodic acid-Schiff) |
| Congo Red |
| Safranin |
| Ziehl–Neelsen |
| Warthin–Starry |
| Neutral Red |

METHOD OF FORMING AN IMAGING CALIBRATION DEVICE

FIELD OF THE INVENTION

The invention relates to the field of microscopy. In particular, the invention relates to a method of forming an imaging calibration device and an imaging calibration device for a biological material imaging system.

BACKGROUND TO THE INVENTION

In histopathology, there are well-known methods of obtaining the anatomy of biological materials such as tissue or cells at microscopic scales. Typical methods for analysing cells involve the preparation of cells by sectioning and staining the cells and then examining the stained cells under a light microscope by a histopathologist. Staining using stains or dyes is an auxiliary technique commonly used in microscopy to enhance contrast in the microscopic image. Different cell types may be combined with different stains of different colours so that the colour of the stained cell may indicate what type or group a cell is. This enables diagnosis of abnormalities or diseases.

The colour produced by each tissue preparation depends on the type of tissue and the strength of the stain used. For example, a thick tissue stained with a stain of higher concentration will produce a stronger colouration, whilst a thin tissue a stained with a stain of lower concentration will produce a weaker colouration. This difference in staining strengths is important and can influence the diagnostic result a histopathologist decides upon. Thus, it is common in this area for the preparation of the stained cells to be standardised, either within a laboratory or between laboratories.

In modern laboratories it has become common practice to view a sample of cells with a digital camera attached to a microscope or to use a very high resolution scanner to digitally reproduce the appearance of the cells over a larger area. This enables the images to be shared between histopathologists without the need for them to be looking down the same microscope at the same sample. A problem with this practice, however, is that the colour appearance of the cells has an additional variation added by the colour response of the microscope, digital camera or scanner and the colour monitor or printer being used to view the image, as each of these devices has its own colour response.

The variation in colour appearance due to different measuring and reproduction equipment is a problem commonly encountered in the graphic arts. This problem is normally addressed by using a standardised calibration process as defined by the International Color Consortium, ICC. This is a standardised way of translating digital values read by a device or equipment into colour measurements defined by the Commission Internationale de l'Eclairage, CIE. The ICC defines a file format which can be used to link the device colour values to an interchange space in device independent CIE colour coordinates. Thus a colour produced by one measurement device or reproduction device can be mapped onto another device such that to a human they appear to be the same colour. This file format is commonly referred to as an ICC profile.

In the graphic arts, an ICC profile is generated by producing matched pairs of values. The reproduction part of the process, i.e. by monitor display or printing, is common in the graphic arts and in a similar way ICC profiles can be used with the reproduction of microscopy images. Typically an input device such as a graphic arts scanner or a studio camera is calibrated or characterised using a colour calibration target. The calibration target typically contains a set of colour patches having a wide range of colours. The colour patches are imaged with the input device which usually produces three values for each colour patch, commonly called RGB, or red, green, blue triplets. The corresponding colour patches of the chart are then measured with a spectrophotometer or other suitable instrument which typically produces 32 sets of spectral reflectance or transmittance values across the visible spectrum. These spectral values can then be converted to CIE colour coordinates using the equations defined by the CIE, which are typically triplets such as CIELab or CIEXYZ. An ICC profile describes the mapping from the RGB values to the CIE colour values.

The colour patches are normally combined into a mosaic of patches referred to as a calibration chart. Typically this is a chart as defined by ISO 12641:1997 "Graphic technology—Prepress digital data exchange—Colour targets for input scanner calibration", but there are other examples of such calibration charts such as the XRite Color Checker. It is normal for the calibration chart to contain the colours typically presented to the image capture system such as a microscope with an attached digital camera.

For graphic arts applications, these calibration charts are produced in every type of film substrate used in order to ensure that the spectral content of each patch is the same as the spectral content of the images being scanned. Otherwise, a phenomenon known as metamerism can cause the ICC profile to correctly calibrate the chart but to give different colours for the image being scanned. In the case of a digital microscope used in pathology this phenomenon can occur when the same colour on the chart and the stained cell have a different spectral content which produce the same CIE colour value but different imaged RGB values.

U.S. Pat. No. 10,241,310 addresses the problem of metamerism in biological imaging systems by providing an imaging calibration device in which discrete regions, such as wells, are stained using a tissue stain to form a colour chart. This enables the colours on the chart and a stained cell imaged with the imaging system to have the same spectral content, thereby preventing metamerism from occurring when the imaging calibration device is used to calibrate the imaging system.

U.S. Pat. No. 9,454,691 builds on the method described by US'310 by overlapping two or more optically transmissive substrates, each of which having been stained using a biological tissue stain, to produce respective discrete regions of the colour calibration device. The substrates are formed of tissue analogues in the sense that they absorb and retain biological tissue stains in a similar sense to biological tissue.

Although the methods described by US'310 and US'691 are largely effective, it is important to only use stains in the chart which are stable in colour over time and do not substantially change after repeated use of the chart. The stable colour patches are generally those that are not strongly colour-saturated, and so this limits the gamut of the chart. Unstable stains may be used during ordinary tissue analysis however the chart will not be able to accurately calibrate the system for colours outside of the gamut of the chart. If the colours are only just outside the gamut of the chart then this is not considered a problem as extrapolation over small distances is normally acceptably accurate. However, if the distance to extrapolate is large then the accuracy of extrapolation may reduce.

Consequently, an imaging calibration device produced with only stable tissue stains according to is less effective at calibrating imaging systems in the high saturation regions of the colour space. US'310 discusses how it is possible to control the stability of certain stains with pH buffer solutions. However, if additional controls are added then this makes the manufacture of the chart more precise and increases the risk of product variability between different manufacturing runs. It is desirable, of course, to have a highly repeatable manufacturing process with minimal standard deviation between different the calibration charts produced. The invention is set in the context of solving these problems.

SUMMARY OF THE INVENTION

A first aspect of the invention is a method of forming an imaging calibration device for a biological material imaging system, the method comprising:

providing a first set of one or more discrete regions upon or within a retaining member, each said region of the first set comprising a selected tissue stain material, wherein each of the selected tissue stain materials exhibits a predetermined optical response inside a colour-stable region of a chromaticity diagram defined by the ellipse $x^2/a^2+y^2/b^2=1$, where a=0.21, b=0.135, the rotation is −0.07 rad and the translation is (0.38, 0.333); and providing a second set of one or more discrete regions upon or within the retaining member, the second set formed of one or more coloured filters having a predetermined optical response outside the colour-stable region.

The imaging calibration device is also referred to herein as a calibration or colour chart, or a colour calibration target. The biological imaging system may be a microscope, for example. The method of forming the imaging device involves constructing a colour chart onto or within a retaining member, for example a microscope slide, where localised tissue stain materials and filters form colour patches of the chart. In its most general form the device may be used as a reference for simple comparison purposes when imaging or viewing a stained tissue sample. However, the device may be used as a more advanced reference device where for example spectral measurements are taken from numerous differently stained regions, having a known staining intensity, and these may then be used as a calibration device to calibrate imaging apparatus.

Each discrete region of the first set is provided for the receipt of a respective tissue stain material. One or more tissue stain materials are typically applied to the said one or more discrete regions such that the said material is localised in the said region. Advantageously, using tissue stain materials as colour patches in the first set means that the colours in the first set of discrete regions and the stained cell imaged with the imaging system should have the same spectral content. This significantly prevents metamerism from occurring when the formed imaging calibration device is used to calibrate the imaging system. The tissue stain materials are also typically produced without the use of stabilising agents such as pH buffers, which simplifies the manufacturing process and increases the consistency of the devices thereby produced.

The aforementioned limitation to the method described by US'310 is also solved. In particular, the addition of the one or more coloured filters increases the gamut of the device beyond what is otherwise achievable using known colour-stable tissue stains. For biological material imaging systems calibrated using the imaging calibration device, this reduces the colour measurement error for any highly saturated tissue stains that may be encountered in practice. It also reduces the distance along the chromaticity diagram that these systems need to extrapolate when encountering strain colours that may exist outside the gamut of the device. Consequently, the device is more effective at calibrating imaging systems in the high saturation regions of the colour space.

Each said discrete region of the second set typically comprises a respective said coloured filter. Only one filter is therefore typically provided for each discrete region of the second set, localised on or in a corresponding portion of the retaining member. The one or more filters have a higher colour saturation than is typically the case for known colour-stable tissue stains produced without stabilising agents. They can therefore act as a substitute for highly colour-saturated tissue stains. Coloured filters will not recreate the exact same spectral response as a stained tissue and so, in order to limit any potential metamerism, the second set typically consists only of colour filters having a predetermined optical response outside of the colour-stable region (i.e. for colour saturations where known tissue stains are unstable).

Each discrete region of the first and second set typically exhibits a different optical response, as measured on a chromaticity diagram. Known tissue stain materials which are stable typically appear within a region of a chromaticity diagram herein referred to herein as the "colour-stable region", as defined by the ellipse $x^2/a^2+y^2/b^2=1$, where a=0.21, b=0.135, the rotation is −0.07 rad and the translation is (0.38,0.333). Conversely, known tissue stains that are unstable typically appear outside of this region. The ellipse is plotted on a CIE xy chromaticity diagram, which is a standard means in the art for visually representing different colours on a two-dimensional graph with x and y coordinates that correspond to different colours. The above ellipse hence defines a boundary within the chromaticity diagram inside of which tissue stain materials may be used for the device, and outside of which coloured filters can be used for the device. However, preferably only colour-stable tissue stain materials are used. In other words, every tissue stain material used should be stable. Tissue stain materials that are unstable typically should not be used in the device but may instead be represented by a corresponding coloured filter patch. Colour-stable tissue stains are defined herein as having a colour measurement error of less than 5ΔE2000 over a period of a year or 100 uses within a biological imaging system. Such use refers to normal exposure to light as part of a calibration process performed by a microscope. Similarly, coloured filter patches having a predetermined optical response inside the colour-stable region should preferably not be used on the device. In other words, every coloured filter provided on the retaining member preferably exhibits an optical response outside the colour-stable region. Every tissue stain applied to the imaging calibration device preferably exhibits a predetermined optical response inside a colour-stable region of a chromaticity diagram.

The one or more coloured filters may be selected so as to have a chromaticity that is similar to that of an unstable tissue stain. For example, on a chromaticity diagram the sum of the differences between the respective x values and the respective y values for coloured filter and a corresponding known unstable tissue stain that is being represented is typically less than 0.1. Exemplary known unstable tissue stains may produce colours with represented by coordinates in the CIE xy chromaticity diagram of (0.19, 0.16), (0.13, 0.49) and (0.53, 0.23), and so corresponding stable filters may be provided with respective optical responses at (0.19, 0.20), (0.15, 0.48) and (0.60, 0.23).

Each said region of the first set typically comprises a stain absorbent material stained with a selected tissue stain material. The one or more of the selected tissue stains are typically deposited in a fluid form to the said one or more discrete regions of the first set such that the said material is localised in the said region. This may occur before or after the stain absorbent material is provided upon or within the retaining member. Coloured filters are generally available in the art and may be manufactured separately. Typically the one or more filters are formed from glass, resin plastic, polyester, polycarbonate or acetate. Furthermore, the predetermined optical response of the one or more filters is typically stable. Providing a second set of one or more discrete regions typically comprises adhering the one or more filters to the retaining member. The second set of one or more discrete regions will hence ultimately be arranged alongside the first set of one or more discrete regions on or within the retaining member.

For general use with microscope imaging devices, the retaining member is preferably a microscope slide as most microscope imaging devices are arranged to image a microscope slide. The retaining member may be formed of a glass material (i.e. a glass slide) or may be formed from paper, plastic or other material, as may any substrate with which the retaining member is engaged in use. The calibration device provides for transmissive imaging in which light is passed through the discrete regions (and stain material received in the regions), Tissue stains are typically non-fluorescent (and therefore different from the type of stains typically used in confocal imaging systems), which makes the device primarily suitable for bright-field imaging systems. The form of the tissue stain materials preferably mimics the form of the stains when in contact with biological material. Accordingly, a tissue stain material may be obtained by "pre-reacting" a stain with another chemical (replicating the role of the biological material) so as to "develop" the stain in the form of the tissue stain material as applied to the retaining member.

This invention finds its particular benefit in transmissive 'bright field' microscopy systems wherein the entire sample or 'discrete region' is fully illuminated by a light source. As this light passes through the sample, in this case a discrete region containing a tissue stain material, certain wavelengths are absorbed or blocked by the stain material (and any other matter in the field of view). The remaining "coloured" light (having a spectrum resulting from the interaction between the incident light, stain material and possibly the "sample" material) is then viewed or detected through the optics of the microscope.

Regions with more matter or stain material in the field of view will appear darker when viewed through the microscope. Thus in order to achieve a uniform colour within each discrete region, (which is key for the purposes of calibration), a constant light path thickness is typically kept within each discrete region. In particular, for each discrete region of the first set, every part of the discrete region preferably produces a common optical path length through the region, as defined in the direction normal to the surface of the retaining member. In other words, within each region the effect is to produce a common spectral response (in terms of light frequency and intensity) to incident light, such as white light, which is independent of the position with the region at which the interaction with the incident light occurs. Typically the common optical path length for one region of the first set will be the same as that for each other region of the first set. However, because the second set is formed from coloured filters and not stain absorbent material, for example, the optical path length through each region from the second set does not need to be equal (and typically is not equal) to that of each region from the first set.

Ordinarily the illumination conditions of the incident light are normal to parallel upper and lower surfaces bounding the said region. The use of parallel planar surfaces is particularly beneficial in providing the common optical path length by ensuring the volume of stain material between opposing points on the respective surfaces is constant within a region. Typically each region of the first set is of the same geometry, thereby ensuring that the spectral response is caused by the stain concentration or type, or any material used to retain or localise the stain.

Each said discrete region of the first set, and preferably also the second set, preferably produces a homogenous spectral response across the region. Furthermore, the stain absorbent material preferably exhibits a similar or the same optical response as stained tissue. However, tissue samples can degrade over time, which leads to colour shifts. It is therefore desirable that the stain absorbent material (where applied) is formed of an analogue of biological tissue or "uniform tissue substitute". Such materials include, but are not limited to cellophane (RTM), cellulose, agar, agarose and gelatine, that can be used as an effective substrate for pathology stains. Typically such materials are manufactured biopolymers. They are preferably provided in the form of a film. It is preferred that such a film is self-supporting to enable ease of processing. Films are useful since they are typically produced with a reliably uniform thickness and are sufficiently thing to provide low attenuation of light when in an unstained state. In general, the stains are applied to the substrate by immersing the film in a bath of the stain at a predetermined concentration. The stains are generally absorbed by the substrate material such that a homogeneous distribution of staining is achieved in the through-thickness direction.

The step of providing the first set of one or more discrete regions preferably comprises staining one or more films of biopolymer and adhering the one or more stained films to the retaining member. The biopolymer may comprise a thin transparent sheet made of regenerated cellulose, such as cellophane (RTM). The biopolymer may be stained, optionally cut into patches and then applied to the retaining member to form the one or more discrete regions of the first set. In a particular implementation, providing the first set of discrete regions comprises: providing at least one first region of a first substrate, the first substrate being formed from an optically transmissive material which is an analogue of biological tissue, wherein the at least one first region is stained using a first biological tissue stain; providing at least one second region of a second substrate, the second substrate being formed from an optically transmissive material which is an analogue of biological tissue, wherein the at least one second region is stained using a second biological tissue stain; and, overlapping at least one pair of the regions, each pair being formed from the overlap of a first region with a second region, such that light incident upon a pair is modulated by the respective first and second biological tissue stains of the respective regions; wherein the overlapped region forms a selectively optically transmissive target of a calibration device for calibrating a bright-field imaging system. Several alternative processes for forming the first set are also envisaged, as detailed below.

The retaining member may be adapted for use with a glass slide and also with a cover or cover slip. For example, the method may further comprise providing a flat cover element for sealing the one or more of the selected tissue stain material(s) upon or within the retaining member. Typically in such cases the discrete regions of the first set are formed as recessed areas or wells, for retaining the stain material in liquid form within the wells. These discrete regions may be machined or cast within the retaining member.

Using recesses or wells enables the localised stain materials to have substantially parallel surfaces normal to the optical axis of the imaging device to ensure a homogenous effect as viewed by the imaging system. The depth of the wells may be significantly larger than the thickness of a typical stained sample and therefore the concentration of the stain material localised in the discrete regions may be reduced accordingly.

Alternatively, the discrete regions of the first set may be provided using a masking element which has cut out regions for defining the discrete regions. The masking element may be for example a gasket which acts as a template or stencil for defining the sides of the wells. The thickness of the gasket may be chosen to define the depth of the discrete regions containing the stain material. Advantageously here, the bottom of the discrete region of the first set is flat, as it is defined by a top side of the retaining member which may be a smooth slide.

The masking member may be mounted onto the surface of the retaining member. In this case the masking element may be a glass cover slip having a number of cut out regions or holes. Advantageously, as in the above case, the bottom of the discrete region of the first set is flat, as it is defined by a top side of the retaining member which may be a smooth slide. An additional advantage is an improved accuracy for defining the size of the discrete region of the first set, as the extent of the region is defined by the holes in the cover slip. This improved definition helps to define the total volume of a region which, with accurate pipetting of the stain material into the region, helps define the thickness of the stain material more accurately. Accordingly, using this method enables a constant light path thickness across each patch from the first set.

A flat cover element may be provided to seal the stain material in the discrete regions of the first set upon or within the retaining member. This ensures that the stain material is localised within these discrete regions. In the case of a retaining member formed as or in association with a slide, this may include the sealing of the stain material (in liquid form) in the wells using an adhered cover slip for example. The calibration of the biological imaging system using the calibration device obtained with the invention may be performed prior to delivery of the imaging system or after installation during later maintenance procedures, over time. In the latter case the localisation of the stain material within the discrete regions of the first set is particularly important.

In some cases the retaining member may be a region of substrate upon which a stain material may be printed or fluid-jetted. Inkjet, flexographic or screen printing are well known techniques which may be used for this purpose. Providing one or more of the selected tissue stain materials may therefore comprises printing the one or more of the selected tissue stain materials onto a surface of the retaining member. Alternatively, one may use spin coating or thin film deposition techniques, preferably defining the discrete regions of the first set using a masking element or by photo-etching the retaining member.

A homogeneous coverage of a discrete region from the first set may be achieved with small adjacent deposits of stain material which mix upon deposition. Surface modification techniques of the retaining member substrate may be used to encourage this. In such cases the thickness of the stain material may be less than in the corresponding samples to be scanned due to the driving off of carrier fluid following the jetting process.

The tissue stain materials localised in the discrete regions may have different concentrations of a common tissue stain (for example a different concentration for each region), or may include mixtures of two or more stains, for example in ranges of concentrations formed as a series. Furthermore, the tissue stain materials localised in the discrete regions may have different optical thicknesses to reproduce graduation in stained tissue. This graduation may be produced for example by diluting the stain material, such that one discrete region has a different level of dilution than that of another discrete region containing the same type of stain. For example, a first tissue stain material localised in a first discrete region of the first set may have a first optical thickness which is higher than a second optical thickness of a second tissue stain material localised in a second discrete region of the first set different from the first discrete region. Said optical thicknesses of said tissue stain materials localised in said discrete regions of the first set are preferably arranged as a series of optical thicknesses representing a range of expected optical thicknesses from actual samples once stained.

Some fluid-jet materials include curable agents known in the art which may be also used to localise or stabilise the deposited material. However, in a further alternative, individual precisely deposited patches of absorbent material such as a processed form of tissue, or more generally biopolymers such as gelatin may be used to retain the stain material. These patches are advantageous as they closely reproduce the properties of biological material. The biological material may include plant or animal material, particularly human tissue.

In a further alternative, providing the discrete regions of the first set comprises providing one or more tissue elements onto or within a carrier, dividing the carrier into one or more carrier slices wherein each carrier slice comprises the one or more tissue elements and providing the one or more slices onto the retaining member. The tissue elements may be deposited onto the carrier using known techniques to thereby form a tissue microarray (TMA). The carrier may be made from paraffin or wax for example and may be in any form, typically a block. The tissue elements are also referred to as 'cores' and may be made from donor tissue or a synthetic tissue substitute, and therefore provide the advantage of having the same or similar properties as a biological material.

A calibration device may be formed using a selection of stain materials applied to small areas of a microscope slide, and one or more coloured filters, to make up a colour calibration chart with colour patches. The colour calibration chart can then be measured with a spectrometer, spectrophotometer or similar instrument to produce spectral data for each patch on either every slide or for a batch of slides. The spectral data may be converted into any form of calibration data including for example CIE colour coordinates such as XYZ or Lab.

A further advantage is that the formed calibration devices may be used with available imaging systems which have an average spatial resolution of less than 50 μm. If, for example, a calibration target was produced with actual stained cells instead of the stain material used in accordance with the invention, a much higher spatial resolution would be required. For example, if the average size of actual cells is approximately 4 μm, some areas within the cell can be less than 0.5 μm. Accordingly, using actual stained cells to create a calibration target would require the registration between the imaging system and the spectral calibration system to have a 0.5 μm spatial resolution. With the systems available in the state of the art, this would be very difficult. Advantageously, the methods in accordance with the invention provide colour charts with relatively 'flat' patches which may be imaged at lower spatial resolution. For example, if the patches are greater than 100 μm in dimension, the accuracy required for the registration between the imaging system and the spectral calibration system is greatly relaxed to less than 50 μm.

Further aspects of the invention will now be described. These may share the same features and advantages as discussed above in connection with the first aspect.

A second aspect of the invention is a method of calibrating an imaging calibration device formed using a method according to the first aspect, the method of calibrating comprising: measuring each discrete region from the first set and each discrete region from the second set to thereby provide spectral data for each of the discrete regions; and mapping one or more of said spectral data to standard colour data to thereby determine calibration data for the imaging calibration device.

A third aspect of the invention is imaging calibration device for a biological material imaging system, the device comprising: a retaining member; a first set of one or more discrete regions located upon or within the retaining member, each said region comprising a selected tissue stain material localised in the said region, wherein each of the selected tissue stain materials exhibits a predetermined optical response inside a colour-stable region of a chromaticity diagram defined by the ellipse $x^2/a^2+y^2/b^2=1$, where a=0.21, b=0.135, the rotation is −0.07 rad and the translation is (0.38,0.333); and a second set of one or more discrete regions upon or within the retaining member, the second set formed of one or more filters having a predetermined optical response outside the colour-stable region.

A fourth aspect is the use of a device according to the third aspect to calibrate a biological material imaging system. Such a system is typically a bright-field imaging system, as earlier discussed.

Examples of such methods will now be described in detail with reference to the following figures.

Embodiments of the invention relate to an imaging calibration device for a biological material imaging system. The device includes a first set of discrete regions or "colour patches" having tissue stain material applied to each said region. A second set of discrete regions is arranged alongside the first set, each region of the second set being formed of a respective coloured filter.

Most tissue stains will change colour gradually over time or with repeated light exposure however some stains, generally those which are most highly colour saturated, will change colour quicker. In order to ensure that the calibration device remains a reliable and effective calibration device, it is important to ensure that the only tissue stains that are used are colour-stable. This is defined herein as having a colour measurement error of less than 5 ΔE2000 after a period of a year or 100 uses of the device for calibrating a biological imaging system. As would be known to one of skill in the art, ΔE2000 (delta E 2000), is a standard formula introduced by the CIE organisation for measuring a colour difference. The requirement to only use colour-stable tissue stains potentially limits the gamut of the colour calibration device because highly colour-saturated regions of the CIE colour space would no longer be represented. This problem is addressed by the inclusion of the one or more coloured filters that form the second set of discrete regions and increase the gamut of the device.

Figure 7:
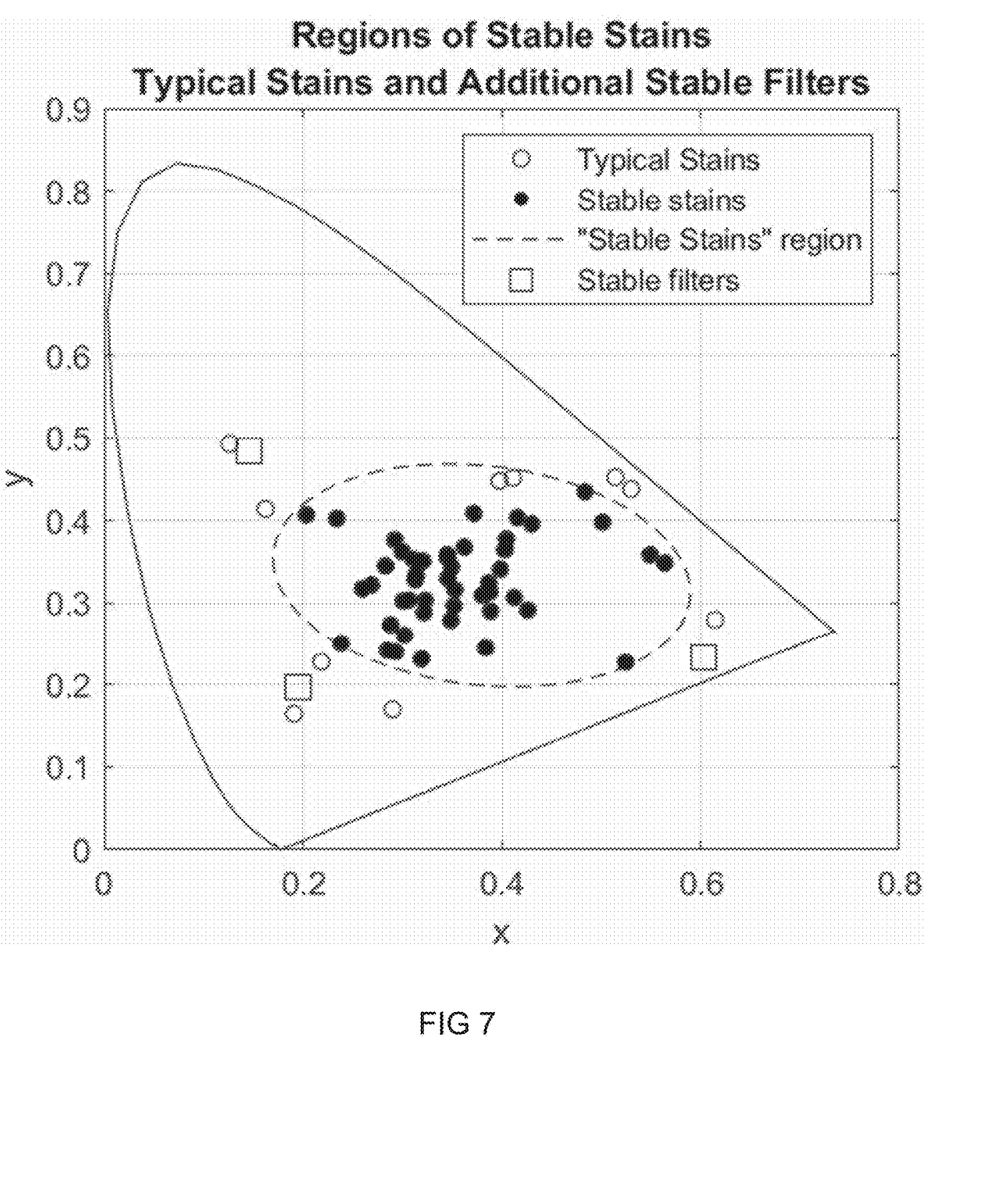
FIG. 7 is a chromaticity diagram showing the stable stain region in accordance with embodiments of the invention.

FIG. 7 is a chromaticity diagram indicating examples of known tissue stains. The optical response of known tissue stains is shown by respective circular markings on the diagram, wherein the colour-stable tissue stains are shaded and the unstable dyes are unshaded. As can be seen, all of the stable stains are clustered around the centre of the diagram, which corresponds to an area of low saturation. A "stable stain" region has been defined herein to include each of these stable stains. The stable stain region is defined by the ellipse $x^2/a^2+y^2/b^2=1$, where a=0.21, b=0.135, the rotation is −0.07 rad and the translation is (0.38,0.333). At a chemical level, the stability of a given stain is not determined by whether it falls within the stable stain region (indeed some known unstable stains fall inside the stable stains region, as shown). However, the stable stain region designates the region of chromaticity diagram in which known stable tissues stains can be found and within which the stable tissue stains facilitate effective colour calibration. Embodiments of the invention provide one or more coloured filters having a chromaticity outside of the stable stains region in order to increase the gamut of the device significantly outside of the stable stain region and facilitate effective calibration at high saturations. Square markings are included in the FIGS. 7 and 8 to show the optical response of respective exemplary colour filters that could be used. Coloured filters are preferably selected to approximate the optical response from a known unstable tissue stain. Exemplary known unstable tissue stains have the chromaticity coordinates (0.19, 0.16), (0.13, 0.49) and (0.53, 0.23), as shown. Corresponding filters have therefore been selected having respective optical responses at (0.19, 0.20), (0.15, 0.48) and (0.60, 0.23) on the chromaticity diagram of FIG. 7.

Figure 8:
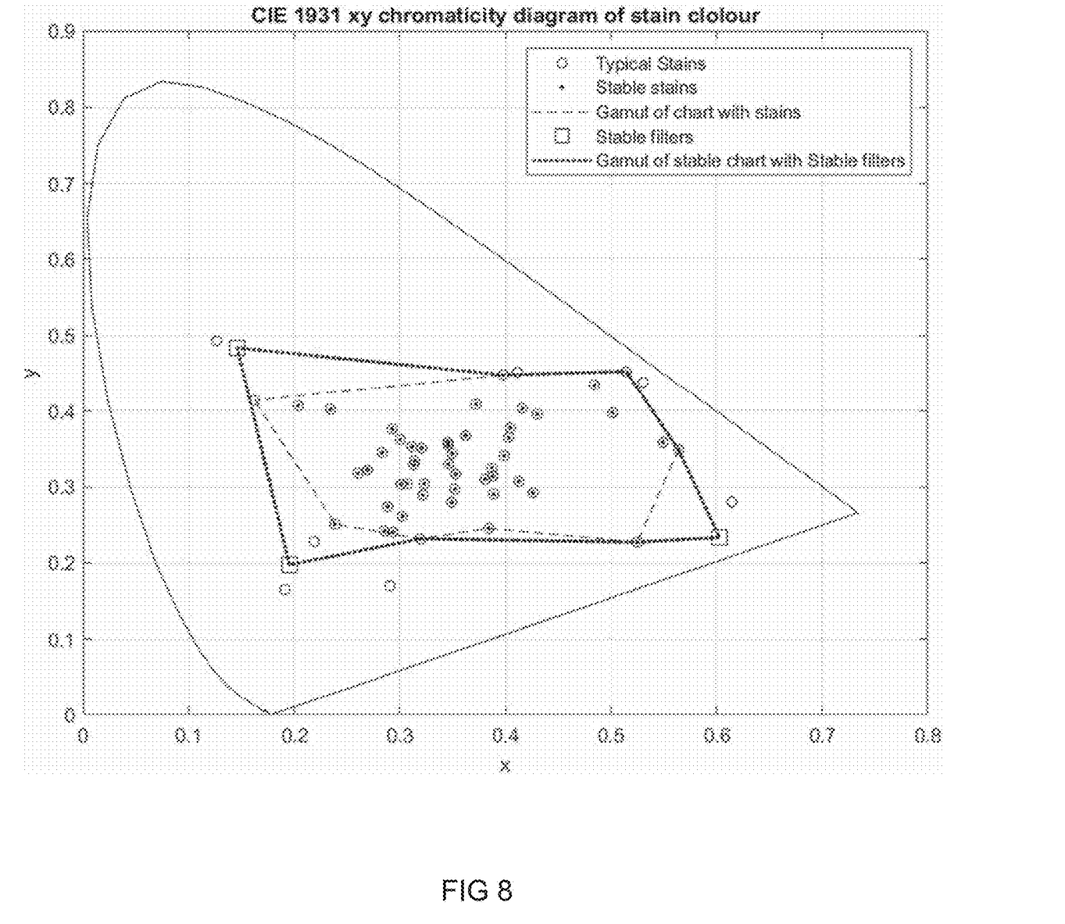
FIG. 8 is a chromaticity diagram showing the gamut of a colour chart according to an embodiment of the invention.

FIG. 8 illustrates the increase in the gamut of the colour calibration device that is achieved by incorporating three colour filters with respective chromaticities (0.19, 0.20), (0.15, 0.48) and (0.60, 0.23). The gamut of a chart according to the prior art formed with stable tissue stains is shown by the dashed line. The gamut extends around the xy coordinates for the outermost stable stains, further incorporating the xy coordinates for some slightly unstable stains. This makes the gamut of this chart larger than that of a chart formed using only the most stable tissue stains. There are a number of stains in the blue region (low x and y) which are significantly outside of the gamut of the chart. This is because the most saturated stable blue stain does not have as much saturation as the unstable blue stains. When a biological material imaging system encounters a tissue stain that is well outside of the gamut of the device, such as is the case for the unstable tissue stains at (0.19, 0.16), (0.13, 0.49) and (0.53, 0.23), the extrapolation error will be large and the colour may therefore be incorrectly recorded by the system. In practice this means that the RBG value will be mapped to an incorrect CIE colour value. The inclusion of the coloured filters significantly increases the gamut of the device, as now shown by the dotted line in FIG. 8. Although the unstable stains at (0.19, 0.16), (0.13, 0.49) and (0.53, 0.23) still lie outside the gamut of the modified device, the extrapolation error will be much lower and, as a consequence, the system will typically more accurately identify the colour of these stains.

The colour patches of the first set are typically formed from deposited patches of absorbent material such as a processed form of tissue that closely reproduce the properties of biological material (referred to herein as an 'analogue of biological tissue'). The biological material may include plant or animal material, particularly human tissue. Consequently the spectral response of the stained colour patches accurately resembles that of a stained tissue sample. The second set of colour patches are formed from coloured filters. Examples of suitable stable filters are Kodak Wratten or a Lee Filters but there are many other filter manufactures and dichroic or glass filters that can be used. These filters are widely available and their manufacture is described for instance at emea.rosco.com/en/color-filters-entertainment-lighting, although some details may be kept confidential by manufacturers. The stability of such colour filters typically far exceeds that of tissue stains. Colour filters are therefore used in the highly saturated regions of the CIE xy colour space where the nearest tissue stains are unstable.

Figure 9:
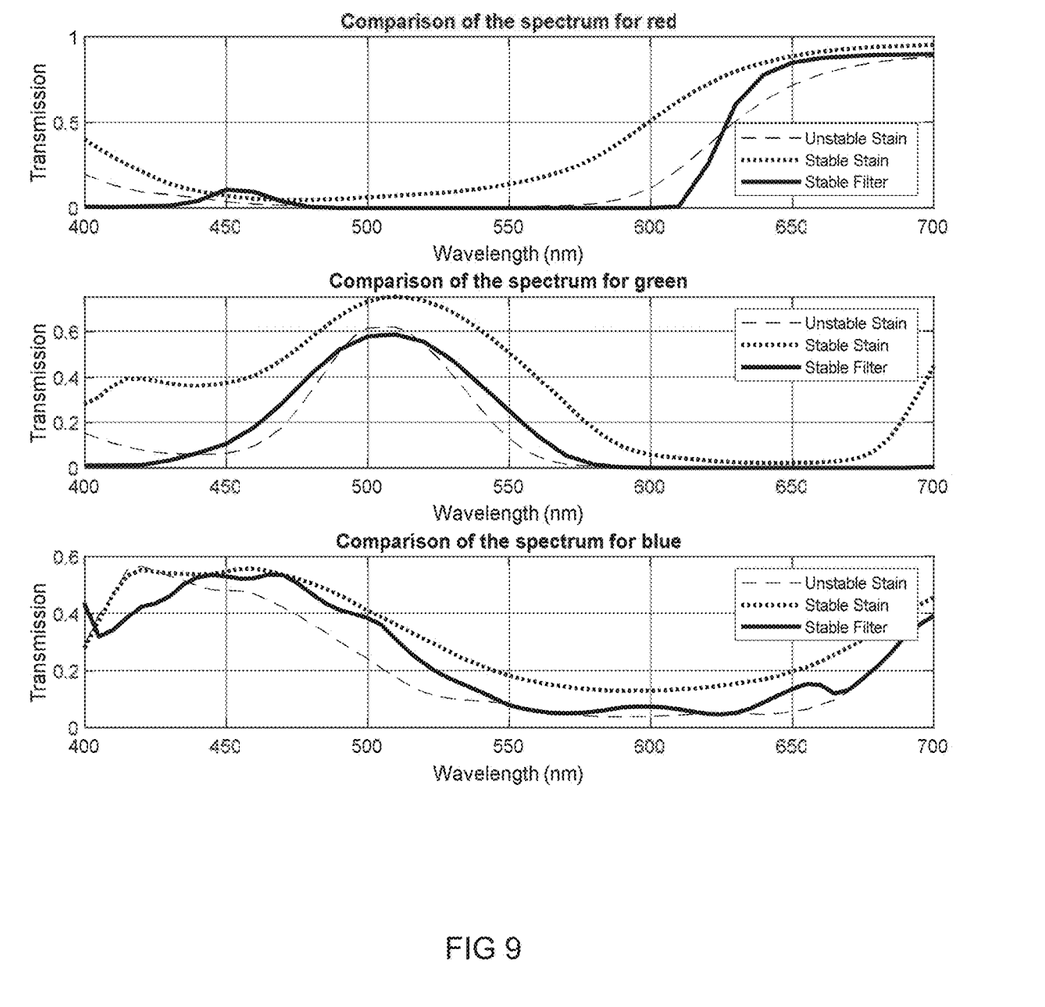
FIG. 9 shows a comparison of the spectral responses for different stains and filters.

In order to limit the potential impact of any metamerism from the second set of discrete regions, filters are preferably selected that exhibit a similar spectral response to a tissue stained with an unstable tissue stain. FIG. 9 illustrates the spectral response for each of the exemplary coloured filters from FIG. 8 alongside the respective optical responses of the nearest stable and unstable tissue stains. Although three coloured filters have been shown here, in practice the colour chart may include any number of coloured filters to facilitate a desired increase in the gamut of the colour chart beyond that which is otherwise achievable using only stable tissue stains.

Exemplary methods for manufacturing the colour calibration device will now be discussed.

Figure 1A:
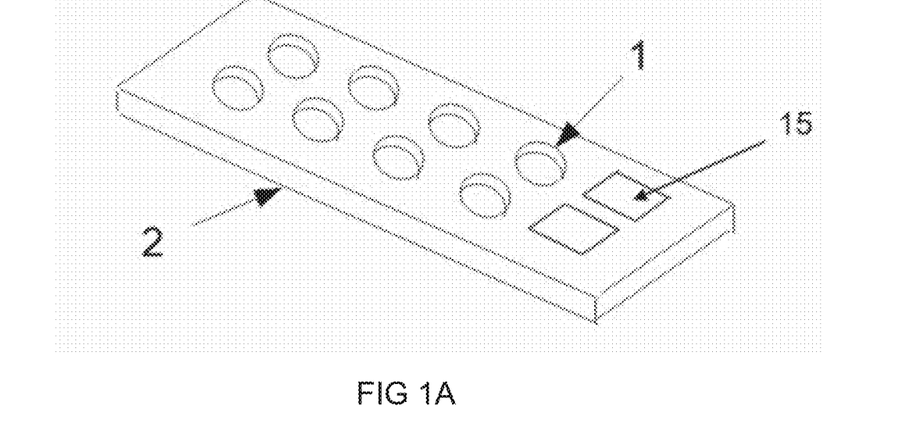
FIGS. 1A and 1B show a first exemplary method of constructing an imaging calibration device in accordance with the invention.
Figure 1B:
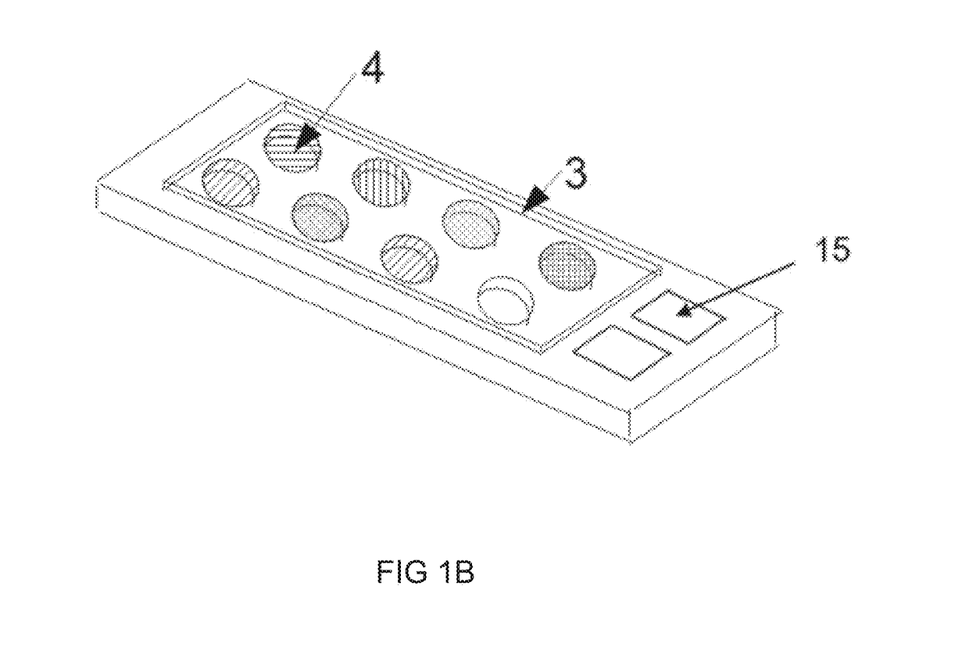

In the first exemplary method shown in FIGS. 1A and 1B, the retaining member is a slide 2, such as a microscope slide. Preferably the slide 2 is made of a suitable transparent material such as glass. A first set of discrete regions is formed within the slide 2 as recessed areas or wells 1 located in one of the major opposing surfaces of the slide 2. Notably the slide thickness is greater than the well depths. The wells 1 can be produced by any suitable method, such as machining into the material of the slide 2 or casting the wells into the slide 2 when the slide is manufactured. Any number of wells 1 can be provided within the slide 2. A typical slide 5 is 75 mm long and 25 mm wide, having a thickness typically around 1 to 3 mm. A stain absorbing material, such as gelatine, is optionally deposited inside each well 1.

In this example the wells are circular, although it would be appreciated that any shape of the well may have any shape, including square. Preferably the bottom of the wells 1 is flat so that a well has a constant depth. The depth of each well 1 (shorter than the thickness of the slide 5) is typically 50 to 600 µm. The width of each well (the diameter of the well in this example) is typically from 0.5 to 2 mm although well sizes covering the full width of the slide are also possible.

A tissue stain material is then deposited into each well 1 to form a colour patch (see FIG. 1B). Each said selected tissue stain material is stable in that it produces a colour measurement error of less than 5 ΔE2000 over a period of a year or 100 scans within a biological imaging system. Preferably the stain material 4 is made from a stain typically used in tissue preparation which has been "developed" to mimic interaction with the tissue. The developing varies depending on the type of cells in the tissue. For example, if a cell contains iron, it will show as blue when stained with a "Prussian blue" stain, due to interaction of the stain with iron. Hence, one needs to "pre-react" or "develop" the stain, that is treat or mix this stain, with an iron containing solution to provide the tissue stain material. However, due to their varying pH levels, other stains may simply react chemically when localised in the discrete regions and do not need to be treated with a particular solution.

Figure 2:
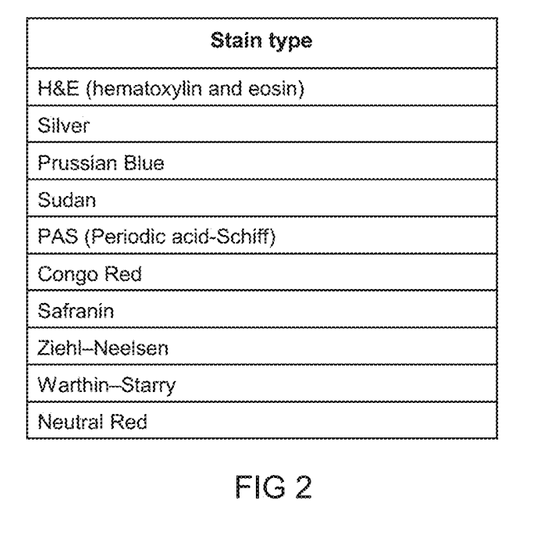
FIG. 2 is a table including a list of stains suitable for the invention.

A list of example stable tissue stains suitable for the methods in accordance with the invention as is listed in the table of FIG. 2. It will be appreciated that this table is not an exclusive list of suitable stains. The deposition of the tissue stain material 4 into each well 1 can be performed manually with a pipette system or it can be automated with a machine. Optionally, a cover 3 may be placed over the wells 1 to act as a seal for the stain material localised in the wells 1 (see FIG. 1B). Where the cover is relatively thin, it may be referred to as a cover slip 3 or sealing layer. Preferably all of the wells 1 formed in the slide 2 are covered and thereby sealed by a single cover 3.

A second set of discrete regions is provided alongside the first set on the slide 2. The second set is formed of patches of coloured filter 15, such as Kodak Wratten or Lee filters (typically formed from glass, resin plastic, polyester, polycarbonate or acetate). In this example two filters 15 are used, although one or more may be included. These filters 15 are cut to shape and then adhered to the slide 2 either before or after formation of the first set of discrete regions. In the embodiment of FIG. 1B the cover 3 does not overlap the filters 15 however optionally it may do so. The optical response of each stained wells 1 is inside the stable region of the chromaticity diagram from FIG. 7 and the optical response of each of the coloured filters 15 is outside this stable region. Accordingly, the coloured filters 15 increase the gamut of the colour calibration device thereby formed.

Figure 3:
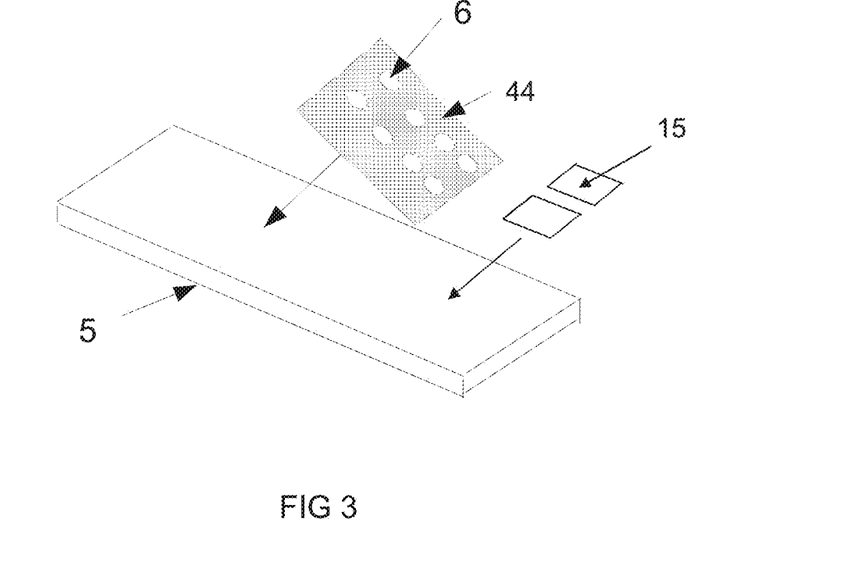
FIG. 3 shows a second exemplary method of constructing an imaging calibration device in accordance with the invention.

A second exemplary method shown in FIG. 3 uses a slide 5 as the base of the wells and the walls of the wells may be provided onto the slide 5 using a masking element, template or stencil to define the sides of the wells. In this example, the masking element is a gasket 44 with cut out regions or holes 6 for well definition. The gasket 44 is relatively thin compared to the slide 5 and therefore may be referred to as a gasket layer 44. The thickness of the gasket layer 44 may be chosen to define the depth of the wells, which is typically 0.1 to 0.2 mm. The gasket layer 44 may be made from any suitable material including glass, silicone, metal, or a plastic polymer for example. Coloured filter patches 15 are adhered to the slide 5, as discussed in the first exemplary method.

The gasket layer 44 may be affixed for example by glueing to a top surface of the slide 5 and the stain material can be deposited into the formed wells using a pipette system for example. Once the wells have been filled with the stable stain material, the wells may be sealed with a cover slip or a sealing layer (not shown). This method has the advantage of an improved flatness of the bottom of the well as it is defined by a top side of the slide 5.

Figure 4A:
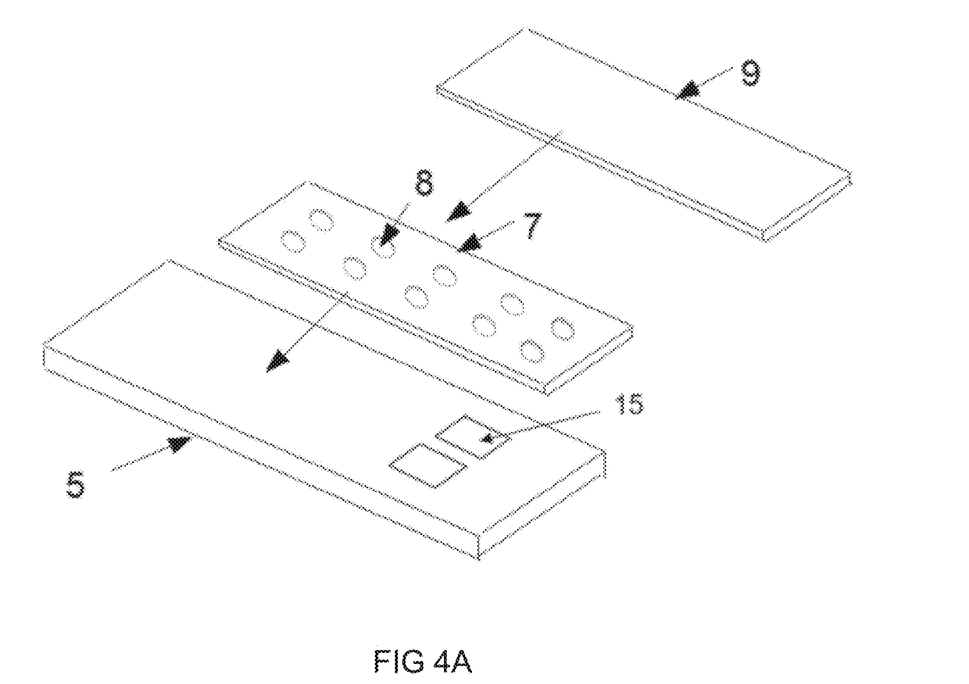
FIGS. 4A and 4B show a third exemplary method of constructing an imaging calibration device in accordance with the invention.
Figure 4B:
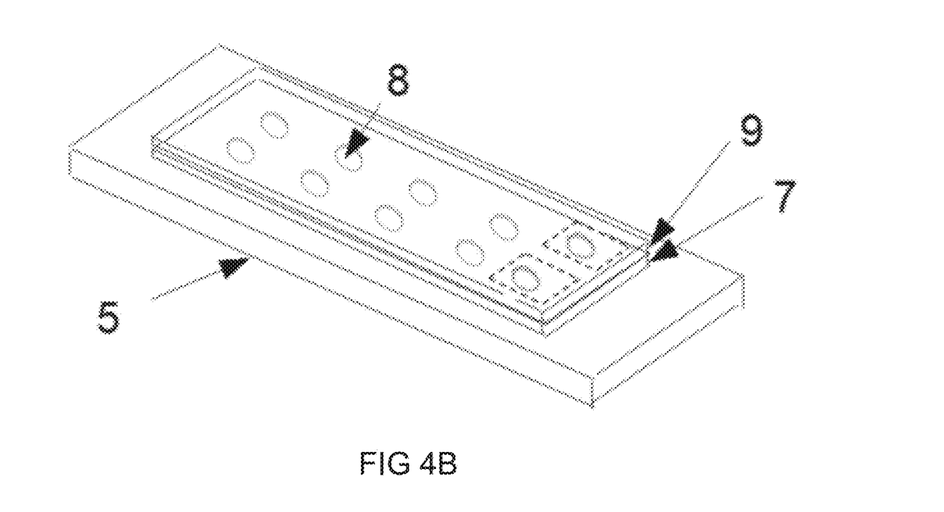

A third exemplary method shown in FIGS. 4A and 4B uses a slide 5 as the base of the wells and defines the sides of the wells by a cover or cover slip 7 which in this example is made from glass. The cover 7 has a number of cut out regions or holes 8 manufactured in the cover slip 7, thereby forming a masking element as described above in the second exemplary method.

The holes 8 may be for example machined or cast into the cover slip 7. The cover 7 is then mounted or permanently attached to the slide 5. The depth of these wells is typically 0.17 mm. A first set of wells is filled with stable tissue stains using a pipette system for example. Each well of a second set of wells overlaps a respective coloured filter 15 that has been applied to the slide 5 prior to the application of the cover 7. Once the first set of wells have been filled with the stable stain materials, they can be sealed with another cover slip or sealing layer 9. In this example the sealing layer 9 overlaps both sets of wells, and so the tissue stains and the coloured filters 15 are visible through the sealing layer 9.

This method has the advantage of an improved flatness of the bottom of the wells as it is defined by the top side of the slide 5. Additionally, by mounting the cover slip 7 onto the slide, this method provides improved accuracy for defining the well size, as the extent of the well is defined by the holes 8 in the cover slip 7. This improved definition helps to define the total volume of a well which, with accurate pipetting of the stain, helps define the thickness of the stain material provided on the slide more accurately.

Figure 5:
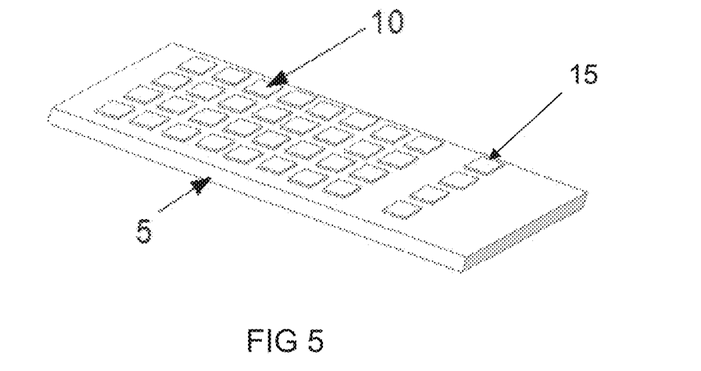
FIG. 5 shows a calibration device formed using a fourth exemplary method of constructing an imaging calibration device in accordance with the invention.

A fourth exemplary method to manufacture the imaging calibration device is to print a stain material in the form of patches 10 onto a slide 5 to form the first set of discrete regions, as shown in FIG. 5, for example with an inkjet printer. Inkjet printing is a well known technique for deposition of well controlled amounts of fluid onto a surface. The second set of discrete regions is again formed by coloured filters 15 that are adhered to the slide 5. In this example four such filters 15 having respective chromaticities outside of the stable region are used.

In this example, the patches 10 are square and are typically 1 mm by 1 mm in size. Depending upon the inkjet printer used, the drop volumes of inkjet printing can typically produce between 1 and 10 pL per drop which, if evenly distributed, can produce a film thickness and therefore patch thickness of 4 to 13 µm. These values are close to the thickness normally produced in stained tissue slides, which are typically 4 to 20 µm thick.

Uniform thick films printed with inkjet printers can be produced by printing multiple adjacent dots of stable stain material and may require some pre-treatment of the slide surface. Such techniques are well known and an example of the printing of a typical stain is published in "Inkjet Printed Prussian Blue Films for Hydrogen Peroxide Detection" Analytical Sciences: February 2012—Hu, Lin, Liao.

An additional alternative to manufacture the imaging calibration device is to print a stain material onto a slide with a screen printing process. A screen printing process typically produces a film thickness of 8 to 20 µm which is also similar to the thickness of stained tissue on slides. Alternatively, flexographic printing can be used, which typically produces 3 to 10 µm thick films.

As a stain only partially attaches to the tissue and the degree of adhesion is dependent upon the chemistry of the tissue, there is a continuous tonal range of the stain. For a colour chart to produce a good mapping from RGB values to defined colour space, it is desirable for this graduation to be reproduced. This graduation can be produced in the tissue stain material by diluting the stain material to be printed for selected individual patches, such that at least one patch has a different level of dilution than that of another patch containing the same type of stain. The stain material may be diluted with a water-based solution for example to decrease the concentration of the stain material to be printed. The graduation can also be produced by printing a diluted solution in multiple layers (i.e. 'overprinting') onto a discrete region to form a thicker patch.

To achieve the desired result, it is the optical thickness of the patch defining the amount of light absorbed by the patch which varies from patch to patch.

A further exemplary method for manufacturing the first set of discrete regions may use a spin coating manufacturing process, using a slide as a substrate and a tissue stain material to coat the substrate. Spin coating is a well-known technique used to apply uniform thin films to flat substrates. A typical film of tissue stain material produced by spin coating has a thickness of between 2 to 10 µm. The substrate is normally in the shape of a disk. One or more slides may be cut from a single disk after manufacturing the substrate. Several techniques may be used to ensure that the stain material is localised on the substrate forming the colour patches. For example, masking or photo etching may be used to achieve deposition of the stain material in only a small area or areas of the substrate. Such techniques are well known and have been commonly used in the manufacturing of electrical circuits.

A further exemplary method for manufacturing the imaging calibration device involves coating a slide using a thin film deposition manufacturing process such as chemical vapour deposition (CVD), physical vapour deposition (PVD), chemical solution deposition (CSD) or chemical bath deposition (CBD). A typical film of tissue stain material produced by this has a thickness of approximately 1 µm. Several techniques may be used to ensure that the stain material is localised on the slide forming the colour patches. For example, masking or photo etching may be used to achieve deposition of the stain material in only a small area or areas of the slide. Coloured filters may be included alongside the stained areas of the slide, as previously discussed.

An alternative for manufacturing the imaging calibration device comprises depositing an absorbing material on the slide to act as a sponge or retaining agent for the stain. This method has the advantage of removing the need to pre-treat the slide prior to the provision of the stain material. Any suitable absorbing material may be used, however biopolymers are preferred, such as collagen.

Collagen is a connective tissue component and may also be used in its purified form of gelatin, which is collagen that has been hydrolysed irreversibly.

The absorbing material may be deposited on the slide using any printing technique described above to form patches of absorbing material in any desired pattern, for example a chequer board pattern. Alternatively, the absorbing material may be deposited on the slide using the spin coating technique described above and then masking or etching the slide to form the patches of absorbing material.

Once the absorbing material is deposited on the slide, each patch of absorbing material can be stained by one or more required stains in the required concentration using any of the printing or pipetting techniques described above. Each patch of absorbing material represents a discrete region on the slide and acts as a boundary for the stain material which is thus localised in the discrete region. Once all the patches of absorbing material are stained, they may be sealed with a covering layer of sealant or with a cover slip. In another example, the first set of discrete regions may be formed from respective stained films of biopolymer, as described by U.S. Pat. No. 9,454,691. For example, a transparent sheet regenerated cellulose may be stained, cut into individual patches having respective colours and then applied to a slide to form the first set of discrete regions.

Figure 6:
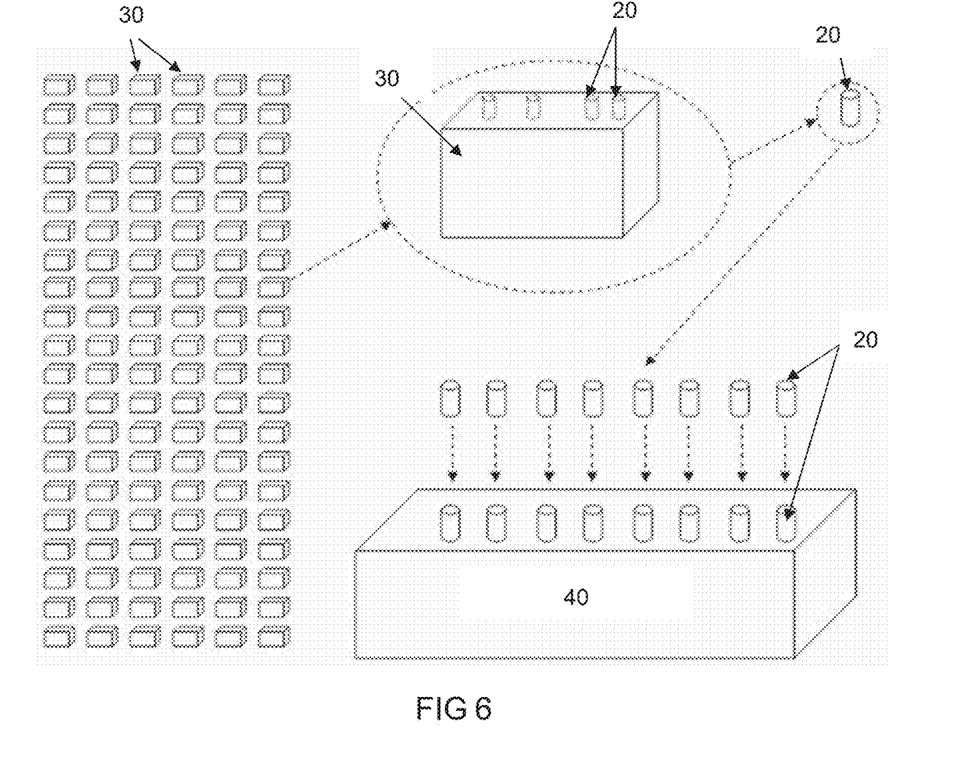
FIG. 6 shows elements of a further exemplary method of constructing an imaging calibration device in accordance with the invention.

A further method for manufacturing the imaging calibration device involves the use of tissue microarrays, TMAs, to form the first set of discrete regions and is schematically represented in FIG. 6. As shown in FIG. 6, a number of tissue elements or cores 20 are obtained from tissue blocks 30. The tissue blocks 30 may be selected depending on the desired application and may be donor tissue or a synthetic, preferably uniform, tissue substitute such as celluloid, gelatin or similar. The cores 20 are stained with each of the stable stains to be used on the slide. These cores 20 are deposited into a carrier 40 which may be a block of paraffin, wax or other suitable material. The cores 20 may be deposited into the carrier 40 using commonly available methods to form a TMA. The carrier 30 may be then sliced thinly and each slice may be placed on a slide and encapsulated using one of the standard procedures commonly employed in the art.

A single slice preferably contains multiple tissue elements. To form the carrier 40, a block of paraffin for example may be cast with defined holes for the cores 20 to be inserted into. A number of cores 20 are typically inserted into the block and "fixed" by softening the block. Once the block is fixed, a slice may be produced using a suitable tool such as a microtome. Accordingly, each slice contains all of the cores 20 used to form the TMA. A slice may be then placed onto a slide 5 and then the paraffin may be evaporated by heating. A cover slip may be then placed over the slide 5 and cores 20. A second set of discrete regions formed of coloured filters is applied to the slide 5 before or after the application of the cover slip, as earlier described, to facilitate colour calibration at high colour saturations.

When these slides are imaged by a microscope, the RGB value of each patch from the microscope image can be used with the spectral or colour data on the patch to produce a mapping from RGB to a calibration data or defined colour space such as Lab, XYZ or sRGB. The calibration data may be an ICC profile or a 3D look up table. Alternatively, a predetermined mathematical function, such as a polynomial mapping function may be used. By imaging all the patches or a subset of the patches on the calibration device, it is possible to provide a mapping from the measured RGB values to the desired colour space.

Optionally, the individual patches of the second set of discrete regions may have the same shape and size as those of the first set of discrete regions. Using the manufacturing methods according to the invention as described above, the imaging calibration device or colour chart may be manufactured with a large number of patches over a large area of the slide. A typical slide would be 75 mm long by 25 mm wide with an area of 62 mm by 23 mm being suitable for imaging by an imaging device. For example, if 1 mm by 1 mm square patches were manufactured with 0.1 mm separation between the patches, over 1000 patches could be produced.

The field of view in a microscope at typical magnification used in tissue imaging may only be 1 mm by 1 mm which sees only one patch. Accordingly, more than 1000 images of the slide would need to be taken to fully image the colour chart. It would be possible to image multiple adjacent patches at once, for example four patches, but this would still require more than 250 images to image the whole colour chart. A whole slide scanner such as the Ventana DP200 can automate this process and the whole chart can easily be imaged for analysis. However, when using a manual microscope with no automation, it would be extremely difficult to capture over 1000 or 250 images in adequate time. When a manual microscope is used, it is possible to image only a sub set of the patches, typically 9 to 30, to produce the mapping. By imaging four adjacent patches at once, up to 120 patches may be imaged. Although mapping with this reduced data set may not be as accurate as using all of the patches in the colour chart, it will still produce a reasonably accurate mapping.

In summary, an improved colour calibration device is thereby provided that facilitates more reliable calibration of bright-field biological imaging systems for highly colour saturated stains. Such stains are typically unstable unless stabilising agents, such as pH buffer solutions, are added, which is not wholly reliable and can affect the variability of the manufacturing process and the colour produced. It is desirable to avoid the use of stabilising agents in order for the manufacturing process to be highly repeatable and have a low standard deviation in the charts thereby produced. Highly colour-saturated stains are therefore substituted for coloured filters to form respective discrete regions of a second set that form part of the calibration device. Such filters are comparatively more stable and their use, in combination with the discrete regions of the first set, overcomes the limitations in the prior art that are identified herein.

The invention claimed is:

1. A method of forming an imaging calibration device for a biological material imaging system, the method comprising:

providing a first set of one or more discrete regions upon or within a retaining member, each said region of the first set comprising a selected tissue stain material, wherein each of the selected tissue stain materials exhibits a predetermined optical response inside a colour-stable region of a chromaticity diagram defined by the ellipse $x^2/a^2+y^2/b^2=1$, where a=0.21, b=0.135, the rotation is −0.07 rad and the translation is (0.38, 0.333); and providing a second set of one or more discrete regions upon or within the retaining member, the second set formed of one or more coloured filters having a predetermined optical response outside the colour-stable region.

2. A method according to claim 1, wherein each said selected tissue stain material is stable in that it produces a colour measurement error of less than 5 ΔE2000 over a period of a year or 100 uses of the device for calibrating a biological imaging system.

3. A method according to claim 2, wherein the one or more filters are stable.

4. A method according to claim 1, wherein the one or more filters are formed from glass, resin plastic, polyester, polycarbonate or acetate.

5. A method according to claim 1, wherein providing a second set of one or more discrete regions comprises adhering the one or more filters to the retaining member.

6. A method of forming an imaging calibration device according to claim 1, wherein each said region of the first set comprises a stain absorbent material stained with a respective selected tissue stain material.

7. A method of forming an imaging calibration device according to claim 1, wherein providing the first set of one or more discrete regions comprises staining one or more films of biopolymer and adhering the one or more stained films to the retaining member.

8. A method of forming an imaging calibration device according to claim 1, wherein providing the first set of one or more discrete regions comprises machining or casting at least one recess area into the retaining member.

9. A method of forming an imaging calibration device according to claim 1, wherein providing the first set of one or more discrete regions comprises providing a masking element onto a surface of the retaining member, wherein the masking element has at least one cut out region for defining the one or more discrete regions of the first set.

10. A method of forming an imaging calibration device according to claim 1, wherein providing the first set of one or more discrete regions comprises printing the one or more of the selected tissue stain materials onto a surface of the retaining member.

11. A method of forming an imaging calibration device according to claim 1, wherein a first tissue stain material localised in a first discrete region of the first set has a first concentration of stain material which is higher than a second concentration of stain material of a second tissue stain material localised in a second discrete region of the first set that is different from the first discrete region.

12. A method of forming an imaging calibration device according to claim 1, wherein providing the first set of one or more discrete regions comprises spin coating the retaining element with one or more tissue stain materials.

13. A method of forming an imaging calibration device according to claim 1, wherein providing the first set of one or more discrete regions comprises providing one or more tissue elements onto or within a carrier, dividing the carrier into one or more carrier slices wherein each carrier slice comprises the one or more tissue elements and providing the one or more carrier slices onto the retaining member.

14. A method of calibrating an imaging calibration device formed using a method according to claim 1, the method of calibrating comprising:
measuring each discrete region from the first set and each discrete region from the second set to thereby provide spectral data for each of the discrete regions; and
mapping one or more of said spectral data to standard colour data to thereby determine calibration data for the imaging calibration device.

15. An imaging calibration device for a biological material imaging system, the device comprising:
a retaining member;
a first set of one or more discrete regions located upon or within the retaining member, each said region comprising a selected tissue stain material localised in the said region, wherein each of the selected tissue stain materials exhibits a predetermined optical response inside a colour-stable region of a chromaticity diagram defined by the ellipse $x^2/a^2+y^2/b^2=1$, where a=0.21, b=0.135, the rotation is −0.07 rad and the translation is (0.38, 0.333); and
a second set of one or more discrete regions upon or within the retaining member, the second set formed of one or more filters having a predetermined optical response outside the colour-stable region.

16. An imaging calibration device according to claim 15, wherein the selected tissue stain is non-fluorescent.

17. An imaging calibration device according to claim 15, wherein each said region comprises a stain absorbent material stained with a respective selected tissue stain material, wherein the stain absorbent material is an analogue of biological tissue.

18. An imaging calibration device according to claim 15, wherein each said discrete region of the first set and the second set produces a homogenous spectral response across the region.

19. An imaging calibration device according to claim 15, wherein every part of each discrete region of the first set has a common optical path length through the region, as defined in the direction normal to the surface of the retaining member.

20. Use of a device according to claim 15 to calibrate a biological material imaging system.

* * * * *